US012561839B2

(12) United States Patent
Santillo et al.

(10) Patent No.: US 12,561,839 B2
(45) Date of Patent: Feb. 24, 2026

(54) SYSTEMS AND METHODS FOR CALIBRATING IMAGE SENSORS OF A VEHICLE

(71) Applicant: Ford Global Technologies, LLC, Dearborn, MI (US)

(72) Inventors: Mario Anthony Santillo, Canton, MI (US); Krishna Bandi, Farmington Hills, MI (US); Gregory P. Linkowski, Dearborn, MI (US); Meghna Menon, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 403 days.

(21) Appl. No.: 18/170,040

(22) Filed: Feb. 16, 2023

(65) Prior Publication Data

US 2024/0282003 A1      Aug. 22, 2024

(51) Int. Cl.
  *G06T 7/80*          (2017.01)
  *G06T 7/70*          (2017.01)
(52) U.S. Cl.
  CPC .................. *G06T 7/80* (2017.01); *G06T 7/70* (2017.01); *G06T 2207/30252* (2013.01)
(58) Field of Classification Search
  CPC .... G06T 7/70; G06T 7/73; G06T 7/80; G06T 2207/30252
  See application file for complete search history.

(56) References Cited

U.S. PATENT DOCUMENTS

| | | | | |
|---|---|---|---|---|
| 10,916,035 | B1 * | 2/2021 | Kroeger | .............. G05D 1/0212 |
| 11,029,390 | B2 | 6/2021 | Fath et al. | |
| 2019/0206084 | A1 * | 7/2019 | Noble | .................... G06V 40/19 |
| 2020/0065996 | A1 * | 2/2020 | Lasaruk | .................... G06T 7/80 |
| 2020/0394445 | A1 * | 12/2020 | Han | ........................... G06T 7/80 |
| 2022/0189054 | A1 | 6/2022 | Kaiser et al. | |
| 2022/0204019 | A1 * | 6/2022 | Lauterbach | ........... G06T 15/205 |
| 2023/0306638 | A1 * | 9/2023 | Adam | ........................ G06T 7/80 |
| 2023/0401745 | A1 * | 12/2023 | Kothari | .................... G06T 7/70 |

FOREIGN PATENT DOCUMENTS

| | | | | |
|---|---|---|---|---|
| DE | 102018216104 A1 * | 3/2020 | .......... G01S 7/4972 |
| DE | 102019005984 | 3/2020 | |
| EP | 4032066 | 7/2022 | |

* cited by examiner

*Primary Examiner* — Kathleen M Broughton
*Assistant Examiner* — Joshua B. Crockett
(74) *Attorney, Agent, or Firm* — Burris Law, PLLC

(57) ABSTRACT

A method includes obtaining infrastructure data from one or more infrastructure sensors, determining an infrastructure-based positional characteristic of the vehicle based on the infrastructure data, obtaining onboard image data from the onboard image sensor, determining an image-based positional characteristic of the vehicle based on the onboard image data and a digital twin of the manufacturing environment, generating an offset matrix based on the infrastructure-based positional characteristic and the image-based positional characteristic, and selectively adjusting a rotation matrix of the onboard image sensor based on the offset matrix and one or more additional offset matrices.

15 Claims, 4 Drawing Sheets

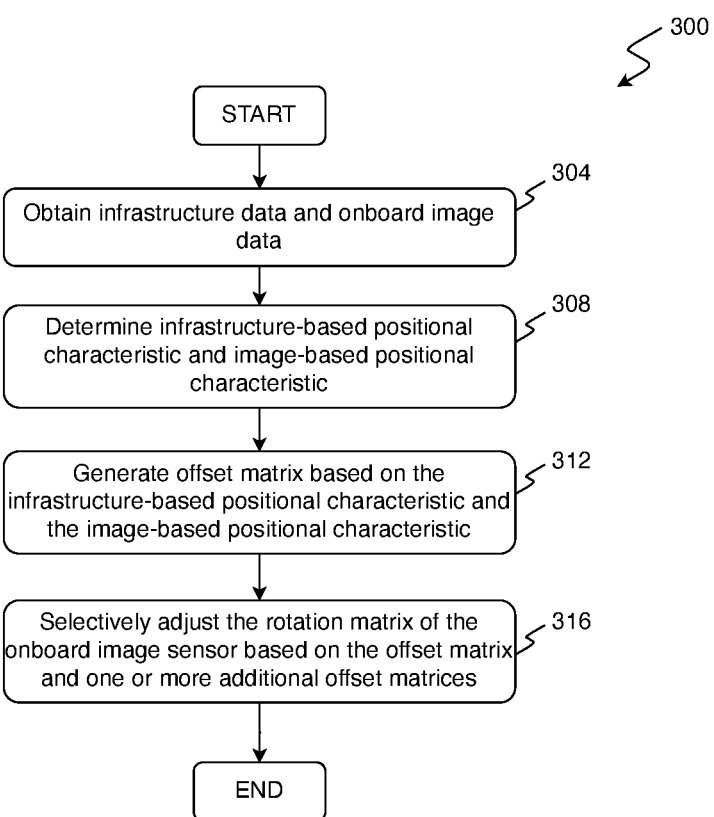

300

START

Obtain infrastructure data and onboard image data    304

Determine infrastructure-based positional characteristic and image-based positional characteristic    308

Generate offset matrix based on the infrastructure-based positional characteristic and the image-based positional characteristic    312

Selectively adjust the rotation matrix of the onboard image sensor based on the offset matrix and one or more additional offset matrices    316

END

FIG. 3

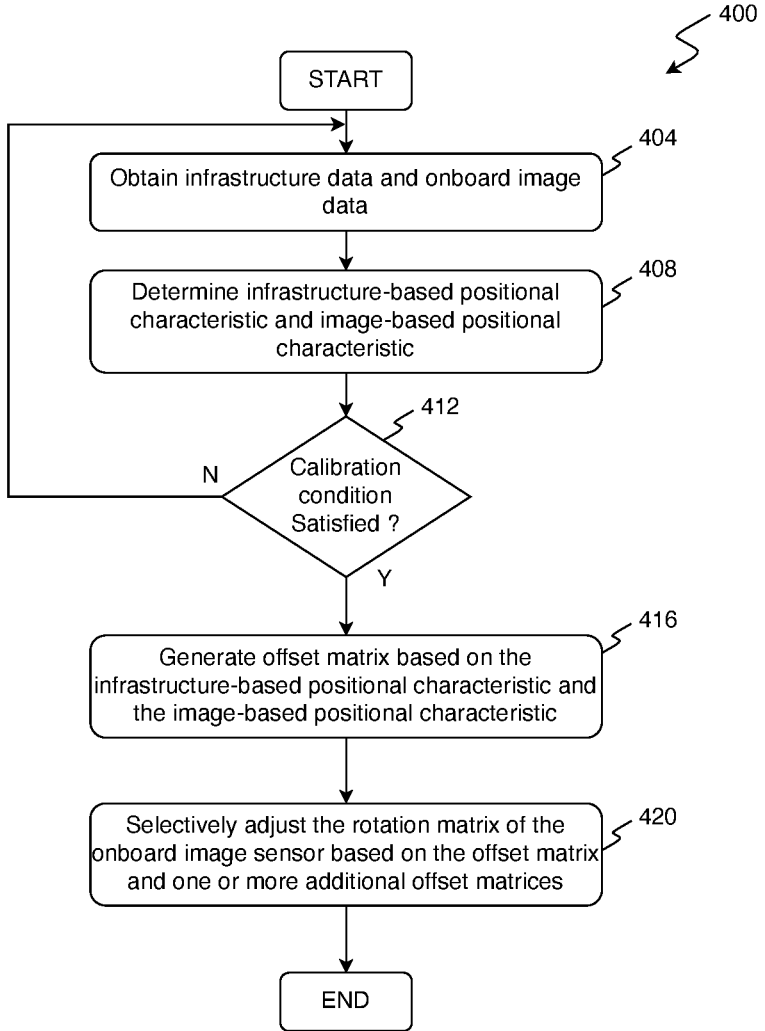

400

START

Obtain infrastructure data and onboard image data — 404

Determine infrastructure-based positional characteristic and image-based positional characteristic — 408

412

Calibration condition Satisfied ?

N

Y

Generate offset matrix based on the infrastructure-based positional characteristic and the image-based positional characteristic — 416

Selectively adjust the rotation matrix of the onboard image sensor based on the offset matrix and one or more additional offset matrices — 420

END

FIG. 4

SYSTEMS AND METHODS FOR CALIBRATING IMAGE SENSORS OF A VEHICLE

FIELD

The present disclosure relates to systems and methods for calibrating image sensors of a vehicle, such as a vehicle camera.

BACKGROUND

The statements in this section merely provide background information related to the present disclosure and may not constitute prior art.

A vehicle manufacturing environment may include one or more end-of-line (EOL) testing stations that are configured to calibrate and verify the functionality of various components of a vehicle. As an example and after the vehicle is assembled, a camera calibration EOL station may calibrate a forward-facing camera that is employed during an automatic emergency braking routine performed by the vehicle. To calibrate the forward-facing camera, the camera calibration EOL station may include a fiducial marker (e.g., a checkerboard) that is placed at a known position in front of the vehicle, and a control module of the vehicle may calculate a distance/pose relative to the fiducial marker to thereby define an offset roll value, an offset pitch value, and an offset yaw value of a rotation matrix of the camera.

However, the camera calibration EOL station inhibits the efficiency of the vehicle inspection/verification process due to the increased labor, time, and infrastructure resources needed to perform the calibration. Additionally, the camera calibration EOL station may not account for dynamic conditions inhibiting the accuracy of the calibration routine, such as lighting, off-axis maneuvers, signal noise, and other factors that inhibit the accuracy of the offset roll, pitch, and yaw determinations. These issues with camera calibration EOL stations, among other issues, are addressed by the present disclosure.

SUMMARY

This section provides a general summary of the disclosure and is not a comprehensive disclosure of its full scope or all of its features.

The present disclosure provides a method for calibrating an onboard image sensor of a vehicle in a manufacturing environment. The method includes obtaining infrastructure data from one or more infrastructure sensors, determining an infrastructure-based positional characteristic of the vehicle based on the infrastructure data, obtaining onboard image data from the onboard image sensor, determining an image-based positional characteristic of the vehicle based on the onboard image data and a digital twin of the manufacturing environment, generating an offset matrix based on the infrastructure-based positional characteristic and the image-based positional characteristic, and selectively adjusting a rotation matrix of the onboard image sensor based on the offset matrix and one or more additional offset matrices.

The following paragraph includes variations of the method of the above paragraph, and the variations may be implemented individually or in any combination.

In one form, selectively adjusting the rotation matrix based on the offset matrix and the one or more additional offset matrices further comprises performing a recursive updating routine based on the rotation matrix based on the offset matrix and the one or more additional offset matrices; the recursive updating routine is a recursive least-squares estimation routine; the recursive updating routine is one of an exponential weighted moving average routine, a gradient descent routine, and a root-finding routine; the rotation matrix defines an offset roll value of the onboard image sensor, an offset pitch value of the onboard image sensor, and an offset yaw value of the onboard image sensor; the infrastructure-based positional characteristic of the vehicle includes an infrastructure-based location of the vehicle, an infrastructure-based pose of the vehicle, or a combination thereof; the image-based positional characteristic of the vehicle includes an image-based location of the vehicle, an image-based pose of the vehicle, or a combination thereof; the method further includes determining whether a calibration condition is satisfied based on the infrastructure-based positional characteristic, the image-based positional characteristic, or a combination thereof, and generating the offset matrix in response to the calibration condition being satisfied; the calibration condition is satisfied in response to a difference between the infrastructure-based positional characteristic and the image-based positional characteristic being less than a threshold difference; the calibration condition is not satisfied in response to the infrastructure-based positional characteristic being associated with an undetectable area of the manufacturing environment; the calibration condition is not satisfied in response to one of the infrastructure-based positional characteristic and the image-based positional characteristic being associated with a predefined noise area of the manufacturing environment; and/or the one or more additional offset matrices are based on one or more additional infrastructure-based positional characteristics and one or more additional image-based positional characteristics.

The present disclosure provides a system for calibrating an onboard image sensor of a vehicle in a manufacturing environment. The system includes one or more processors and one or more nontransitory computer-readable mediums comprising instructions that are executable by the one or more processors. The instructions include obtaining infrastructure data from one or more infrastructure sensors, determining an infrastructure-based positional characteristic of the vehicle based on the infrastructure data, obtaining onboard image data from the onboard image sensor, determining an image-based positional characteristic of the vehicle based on the onboard image data and a digital twin of the manufacturing environment, determining whether a calibration condition is satisfied based on the infrastructure-based positional characteristic, the image-based positional characteristic, or a combination thereof, and in response to the calibration condition being satisfied: generating an offset matrix based on the infrastructure-based positional characteristic and the image-based positional characteristic, and selectively adjusting a rotation matrix of the onboard image sensor based on the offset matrix and one or more additional offset matrices.

The following paragraph includes variations of the system of the above paragraph, and the variations may be implemented individually or in any combination.

In one form, selectively adjusting the rotation matrix based on the offset matrix and the one or more additional offset matrices further comprises performing a recursive least-squares estimation routine based on the rotation matrix based on the offset matrix and the one or more additional offset matrices; the rotation matrix defines an offset roll value of the onboard image sensor, an offset pitch value of the onboard image sensor, and an offset yaw value of the onboard image sensor; the infrastructure-based positional characteristic of the vehicle includes an infrastructure-based location of the vehicle, an infrastructure-based pose of the vehicle, or a combination thereof, and the image-based positional characteristic of the vehicle includes an image-based location of the vehicle, an image-based pose of the vehicle, or a combination thereof; the calibration condition is satisfied in response to a difference between the infrastructure-based positional characteristic and the image-based positional characteristic being less than a threshold difference; the calibration condition is not satisfied in response to the infrastructure-based positional characteristic being associated with an undetectable area of the manufacturing environment; the calibration condition is not satisfied in response to one of the infrastructure-based positional characteristic and the image-based positional characteristic being associated with a predefined noise area of the manufacturing environment.

The present disclosure provides another method for calibrating an onboard image sensor of a vehicle in a manufacturing environment. The method includes obtaining infrastructure data from one or more infrastructure sensors, determining an infrastructure-based positional characteristic of the vehicle based on the infrastructure data, obtaining onboard image data from the onboard image sensor, determining an image-based positional characteristic of the vehicle based on the onboard image data and a digital twin of the manufacturing environment, determining whether a calibration condition is satisfied based on the infrastructure-based positional characteristic, the image-based positional characteristic, or a combination thereof, and in response to the calibration condition being satisfied: generating an offset matrix based on the infrastructure-based positional characteristic and the image-based positional characteristic, and selectively adjusting a rotation matrix of the onboard image sensor based on the offset matrix and one or more additional offset matrices.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 3 is a flowchart illustrating an example routine for calibrating an onboard image sensor of a vehicle in accordance with the teachings of the present disclosure; and FIG. 4 is a flowchart illustrating another example routine for calibrating an onboard image sensor of a vehicle in accordance with the teachings of the present disclosure.

Figure 1:
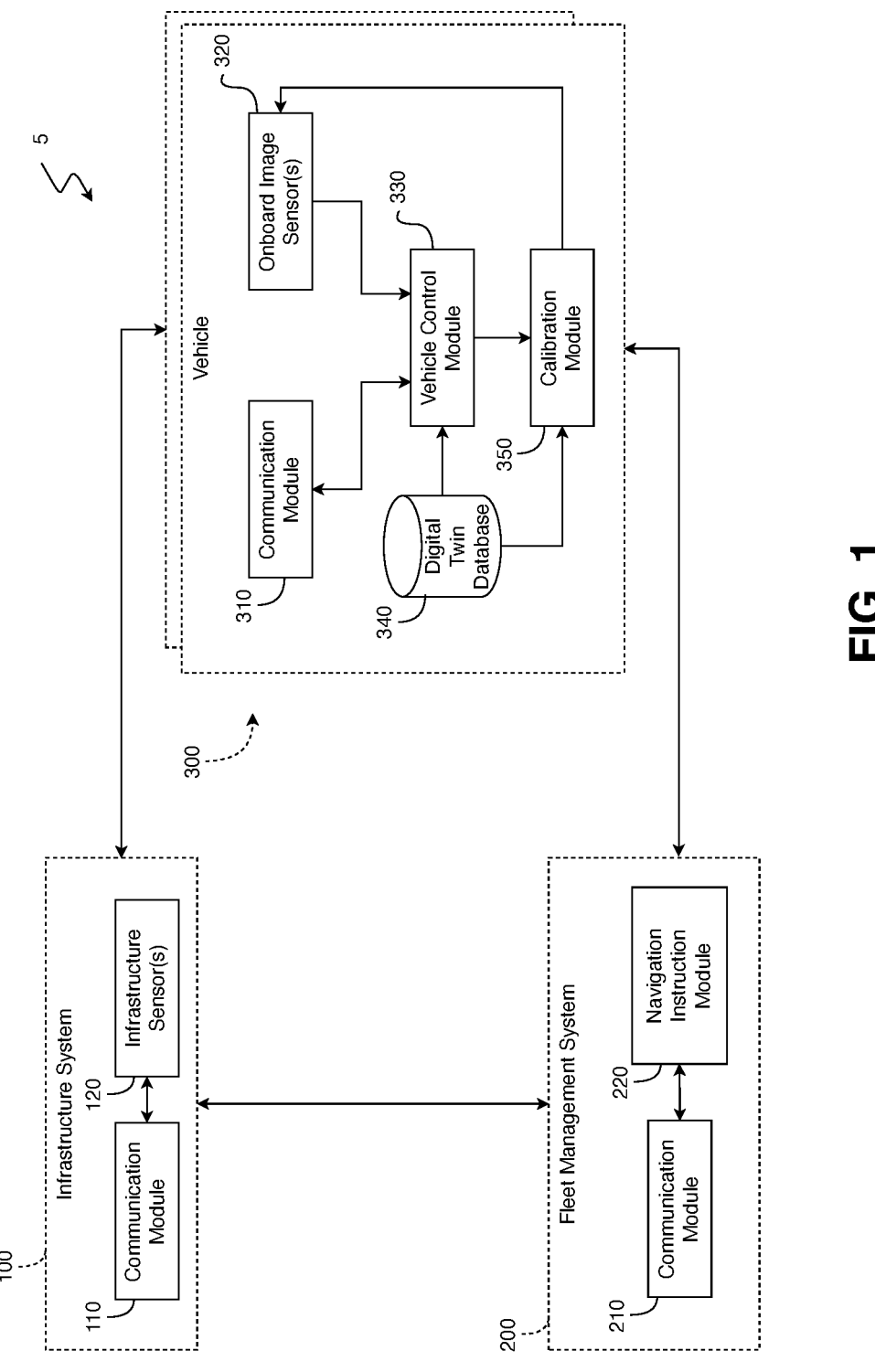
FIG. 1 is a block diagram of an example manufacturing environment in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides systems and methods for calibrating an onboard image sensor of a vehicle as it navigates within a manufacturing environment without a dedicated camera calibration EOL station. Specifically, a vehicle control module determines an infrastructure-based positional characteristic of the vehicle and an image-based positional characteristic of the vehicle and generates an offset matrix based on the infrastructure-based positional characteristic and the image-based positional characteristic. The vehicle control module further selectively adjusts a rotation matrix of the onboard image sensor based on the offset matrix and one or more additional offset matrices based on, for example, a recursive estimation updating routine. Accordingly, the accuracy of the camera calibration routines is improved, as the offset roll value, offset pitch value, and offset yaw value of the rotation matrix of the onboard image sensors are independent of the dynamic conditions of the manufacturing environment that inhibit the accuracy of static camera calibration EOL testing stations. Additionally, the efficiency of the camera calibration routines is improved by dynamically performing the calibration as the vehicle navigates within the manufacturing environment as opposed to having a dedicated camera calibration EOL testing station.

Referring to FIG. 1, a manufacturing environment 5 is shown and generally includes an infrastructure system 100, a fleet management system 200, and a plurality of vehicles 300. In one form, the infrastructure system 100 includes a communication module 110 and one or more infrastructure sensors 120, and the fleet management system 200 includes a communication module 210, and a navigation instruction module 220. In one form, the vehicles 300 each include a communication module 310, one or more onboard image sensors 320, a vehicle control module 330, a digital twin database 340, and a calibration module 350. It should be understood that any one of the components of the infrastructure system 100, the fleet management system 200, and the vehicles 300 can be provided at the same location or distributed at different locations (e.g., via one or more edge computing devices) and communicably coupled accordingly.

In one form, the infrastructure system 100, the fleet management system 200, and the vehicles 300 are communicably coupled via the communication modules 110, 210, 310. As an example, the communication modules 110, 210, 310 may employ known wireless communication protocols to communicate, such as a cellular protocol, a wireless fidelity (Wi-Fi)-type protocol, a Bluetooth®-type protocol, a near-field communication (NFC) protocol, and/or an ultra-wideband (UWB) protocol. Additionally, or alternatively, communication modules 110, 210, 310 may employ a vehicle-to-vehicle, a vehicle-to-infrastructure, a vehicle-to-network, a vehicle-to-grid communication system, an infrastructure-to-vehicle, an infrastructure-to-infrastructure, an infrastructure-to-network, and/or an infrastructure-to-grid, communication system to communicate (e.g., a CV2X and/or or dedicated short range communication (DSRC) protocol). Accordingly, the communication modules 110, 210, 310 may include one or more transceivers, modulation/demodulation circuits, controllers, routers, and/or input/output interface hardware to perform the functionality described herein.

In one form, the one or more infrastructure sensors 120 are configured to obtain infrastructure sensor data associated with manufacturing environment 5, such as the vehicles 300.

As an example, the one or more infrastructure sensors 120 include image sensors (e.g., a two-dimensional camera, a three-dimensional camera, an infrared sensor, a radar scanner, a laser scanner, a LIDAR sensor, and/or an ultrasonic sensor) that obtain image data (as the infrastructure sensor data) of the vehicles 300. As described below in further detail, the fleet management system 200 is configured to control a movement of the vehicles 300 based on the image data. In one form, the infrastructure sensors 120 are disposed on an infrastructure element within the manufacturing environment 5, such as a tower, a light pole, a building, a sign, an automated guided vehicle, among others fixed and/or moveable elements. As an example, the one or more infrastructure sensors 120 may be attached or secured to a drone that is configured to autonomously navigate within the manufacturing environment 5 to obtain the infrastructure sensor data. In one form, the one or more infrastructure sensors 120 broadcast the sensor data to the fleet management system 200 via the communication module 110.

In one form, the navigation instruction module 220 is configured to control a movement of the vehicles 300 within the manufacturing environment 5 based on the image data obtained from the one or more infrastructure sensors 120 and status data obtained from the vehicle control module 330. As an example, the navigation instruction module 220 is configured to perform one or more known path planning routines to define a path for the vehicles 300 and broadcasts one or more commands to autonomously control the vehicles 300 along the defined paths by employing known autonomous navigation routines. As a more specific example, the navigation instruction module 220 instructs the vehicles 300 to autonomously navigate between one or more validation/inspection stations (e.g., one or vehicle end-of-line (EOL) testing stations) of the manufacturing environment 5 based on the infrastructure data generated by the one or more infrastructure sensors 120.

In one form, the one or more onboard image sensors 320 are disposed at the vehicle 300 and are configured to obtain image data of the manufacturing environment 5. The onboard image sensors 320 may include, but are not limited to, a two-dimensional (2D) camera, a 3D camera, a red-green-blue (RGB)-camera, a stereo vision camera, an infrared sensor, a radar scanner, a laser scanner, a light detection and ranging (LIDAR) sensor, and/or an ultrasonic sensor. As a specific example, the one or more onboard image sensors 320 are provided by a forward-facing camera that is employed during an automatic emergency braking routine performed by the vehicle 300. In one form, the one or more onboard image sensors 320 have various image sensor characteristics, such as a pixel density, focal length, height, width, and/or geometry. Additionally, the image sensor characteristics may define a translation vector and/or a rotation matrix that are collectively employed to transform coordinates between a coordinate system of the onboard image sensor 320 to a coordinate system of the manufacturing environment 5.

As an example, the rotation matrix defines an offset roll value, offset pitch value, and offset yaw value of the onboard image sensor 320. As used herein, the "offset roll value" refers to a deviation of the roll value relative to a ground plane of the vehicle 300 or the manufacturing environment 5, such as a surface traversed by the vehicle 300 as it operates within the manufacturing environment 5 (e.g., a parking lot, a floor, etc.). As used herein, the "offset pitch value" refers to a deviation of the pitch value relative to the ground plane of the vehicle 300 or the manufacturing environment 5. As used herein, the "offset yaw value" refers to a deviation of the yaw value relative to a vertical plane of the vehicle 300 or the manufacturing environment 5.

Figure 2:
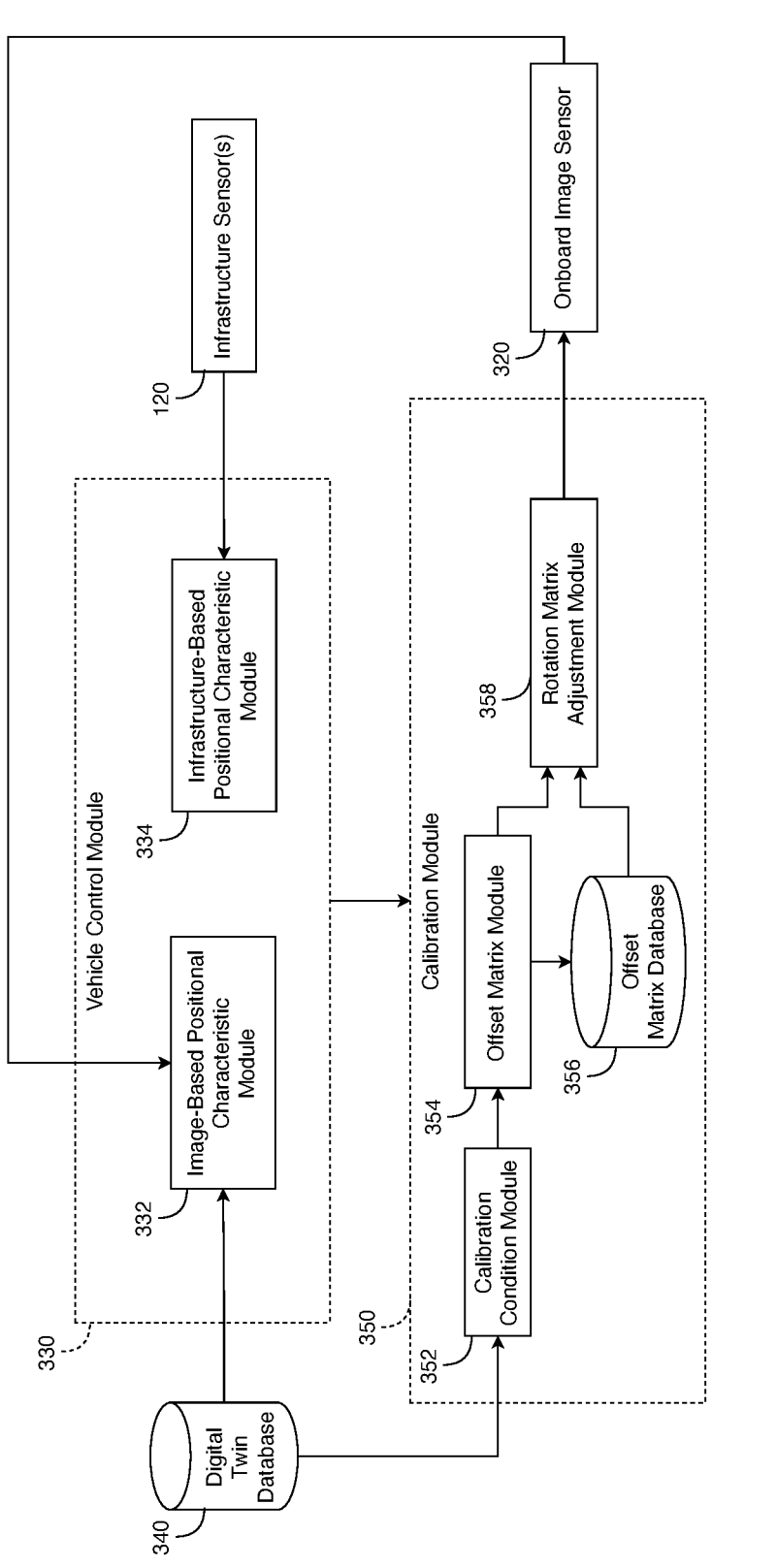
FIG. 2 is a block diagram of a vehicle control module and a calibration module in accordance with the teachings of the present disclosure.

Referring to FIGS. 1-2, the vehicle control module 330 includes an image-based positional characteristic module 332 and an infrastructure-based positional characteristic module 334, and the calibration module 350 includes a calibration condition module 352, an offset matrix module 354, an offset matrix database 356, and a rotation matrix adjustment module 358. In one form, the image-based positional characteristic module 332 determines an image-based positional characteristic of the vehicle 300 based on the image data obtained by the onboard image sensor 320 and a digital twin of the manufacturing environment 5 stored in the digital twin database 340. As used herein, "digital twin" refers to a three-dimensional (3D) digital model that includes digital representations of various elements within the manufacturing environment 5 and the corresponding dimensions, 3D position coordinates, and orientations. Example digital representations of the systems/components include virtual sensors (e.g., digital representations of the infrastructure sensors 120), virtual robots, virtual poles, virtual beams, virtual conveyors, virtual workstations, among other elements of the manufacturing environment 5. In one form, the digital twin is a computer-aided design (CAD) file, a standard tessellation language (STL) file, and/or any other file type configured to provide a 3D digital model of the manufacturing environment 5.

Additionally, the digital twin may further include one or more radio frequency (RF) heat maps that define RF signal characteristics associated within one or more current or previous RF signals broadcasted within the manufacturing environment 5, such as RF signal magnitudes and/or RF interference. In one form, the digital twin may further define undetectable areas within the manufacturing environment 5 (e.g., occluded areas). As described below in further detail, the calibration module 350 may determine whether a calibration condition is satisfied based on the RF heat maps and/or the presence of undetectable areas within the manufacturing environment 5.

In one form, the image-based positional characteristic of the vehicle 300 includes an image-based location of the vehicle 300, an image-based pose of the vehicle 300, or a combination thereof. As used herein, "image-based location of the vehicle 300" refers to a location of the vehicle 300 that is determined based on the image data obtained from the onboard image sensor 320, and "image-based pose of the vehicle 300" refers to a pose of the vehicle 300 that is determined based on the image data obtained from the one or more onboard image sensors 320.

As an example, the image-based positional characteristic module 332 performs known image processing routines (e.g., a difference-based image processing routine, a semantic-based image processing routine, among others) on the image data to detect objects within the manufacturing environment 5. As a more specific example, the image-based positional characteristic module 332 detects the objects by comparing the image data to the digital twin during a difference-based image processing routine. As another more specific example, the image-based positional characteristic module 332 detects the objects by performing a semantic-based image processing routine on the image data and comparing the classified objects to the digital twin. As yet another more specific example, the image-based positional characteristic module 332 detects the objects by decoding fiducial markers disposed thereon and correlating the decoded fiducial markers to one or more objects of the digital twin. Example routines for decoding fiducial markers provided within image data are disclosed in U.S. Pat. No. 11,417,015 titled "DECENTRALIZED LOCATION DETERMINATION SYSTEMS AND METHODS," which is commonly owned with the present application and the contents of which are incorporated herein by reference in its entirety.

In response to detecting the objects, the image-based positional characteristic module 332 identifies the 3D position coordinates and pose of the detected object defined by the digital twin and performs known image-based processing routines to determine an image-based distance and pose between the vehicle 300 and the detected object. Specifically, the image-based positional characteristic module 332 employs known image-based distance and posed determination routines to determine the image-based distance and pose, respectively, based on the image data and the image sensor characteristics (e.g., a pixel density, focal length, height, width, and/or geometry). Subsequently, the image-based positional characteristic module 332 determines the location of the vehicle 300 (as the image-based location of the vehicle 300) based on the image-based distances and the position coordinate of the detected object. Additionally, the image-based positional characteristic module 332 determines the pose of the vehicle 300 (as the image-based pose of the vehicle 300) based on the image-based pose and the position coordinate of the detected object.

In one form, the infrastructure-based positional characteristic module 334 determines an infrastructure-based positional characteristic of the vehicle 300 based on the infrastructure data obtained from the one or more infrastructure sensors 120. In one form, the infrastructure-based positional characteristic of the vehicle 300 includes an infrastructure-based location of the vehicle 300, an infrastructure-based pose of the vehicle 300, or a combination thereof. As used herein, "infrastructure-based location of the vehicle 300" refers to a location of the vehicle 300 that is determined based on the infrastructure data obtained from the one or more infrastructure sensors 120, and "infrastructure-based pose of the vehicle 300" refers to a pose of the vehicle 300 that is determined based on the infrastructure data obtained from the one or more infrastructure sensors 120. As an example, the infrastructure-based positional characteristic module 334 is configured to perform known location and/or pose determination routines to determine the positional characteristic of the vehicle 300 based on the infrastructure data (e.g., image data of the manufacturing environment 5).

In one form, the calibration condition module 352 determines whether a calibration condition is satisfied based on the infrastructure-based positional characteristic, the image-based positional characteristic, or a combination thereof. That is, the calibration condition module 352 determines whether the one or more onboard image sensors 320 need to be calibrated based on the infrastructure-based positional characteristic and/or the image-based positional characteristic. When the calibration condition is satisfied, the calibration condition module 352 instructs the offset matrix module 354 and the rotation matrix adjustment module 358 to collectively calibrate a rotation matrix of the onboard image sensor 320. Additional details regarding the calibration routine are provided below.

As an example, the calibration condition may be satisfied in response to a difference between the infrastructure-based positional characteristic and the image-based positional characteristic being less than a threshold difference. That is, when the infrastructure-based positional characteristic and the image-based positional characteristic deviate beyond the threshold difference, the offset matrix module 354 and the rotation matrix adjustment module 358 refrain from calibrating the rotation matrix of the onboard image sensor 320 due to, for example, a potential error associated with at least one of the infrastructure-based positional characteristic and the image-based positional characteristic. When the infrastructure-based positional characteristic and the image-based positional characteristic do not deviate beyond the threshold difference (i.e., the calibration condition is satisfied), the positional characteristics may be sufficiently accurate. Accordingly, the offset matrix module 354 and the rotation matrix adjustment module 358 may subsequently calibrate the rotation matrix of the onboard image sensor 320 when the calibration condition is satisfied.

As another example, the calibration condition may not be satisfied in response to the infrastructure-based positional characteristic or the image-based positional characteristic being associated with a predefined noise area of the manufacturing environment 5. That is, the digital twin may further include a plurality of RF heat maps that overlay the 3D digital model of the manufacturing environment 5, where each RF heat map indicates RF signal magnitudes and/or noise/interference for a given wireless communication channel. As a specific example, the digital twin may include eleven overlayed digital RF heat maps for each channel of a 2.4 GHz band Wi-Fi communication protocol, forty-five overlayed digital RF heat maps for each channel of the 5 GHz band Wi-Fi communication protocol, and so on. Example RF heat maps are disclosed in U.S. patent application Ser. No. 17/122,413 titled "RADIO FREQUENCY SPECTRUM MANAGEMENT SYSTEMS AND METHODS IN A MANUFACTURING ENVIRONMENT," which is commonly owned with the present application and the contents of which are incorporated herein by reference in its entirety. Accordingly, when the infrastructure-based or image-based positional characteristics are associated with a noisy or high interference area (as defined by the one or more overlayed RF heat maps of the digital twin), the offset matrix module 354 and the rotation matrix adjustment module 358 refrain from calibrating the rotation matrix of the onboard image sensor 320 to inhibit noise-induced errors.

As yet another example, the calibration condition may not be satisfied in response to the infrastructure-based positional characteristic being associated with an undetectable area of the manufacturing environment 5. Specifically, the placement and orientation of the infrastructure sensors 120 may be determined based on a sensor placement computing routine that optimizes sensor coverage of the manufacturing environment 5 by selectively designating the sizes and locations of detectable areas and undetectable areas of the manufacturing environment 5. Example sensor placement routines are disclosed in U.S. patent application Ser. No. 17/143,634 titled "METHOD AND SYSTEM FOR DETERMINING SENSOR PLACEMENT FOR A WORKSPACE BASED ON ROBOT POSE SCENARIOS," which is commonly owned with the present application and the contents of which are incorporated herein by reference in its entirety. Accordingly, when the infrastructure-based or image-based positional characteristics are associated with an undetectable area of the manufacturing environment 5, the offset matrix module 354 and the rotation matrix adjustment module 358 refrain from calibrating the rotation matrix of the onboard image sensor 320 due to, for example, a potential error associated with at least one of the infrastructure-based positional characteristic and the image-based positional characteristic.

When the calibration condition module 352 determines that the calibration condition is satisfied, the offset matrix module 354 generates an offset matrix based on the infrastructure-based positional characteristic and the image-based positional characteristic. In one form, the offset matrix is further based on an image-based rotation matrix of the onboard image sensor 320 and an infrastructure-based rotation matrix of the onboard image sensor 320, where each of the image-based rotation matrix and the infrastructure-based rotation matrices define an offset roll, offset yaw, and offset pitch value.

As an example, the offset matrix module 354 calculates the image-based rotation matrix based on the image-based positional characteristic of the vehicle 300 and a known positional characteristic of an object detected by the onboard image sensor 320 (as indicated by the digital twin). Furthermore, the offset matrix module 354 calculates the infrastructure-based rotation matrix based on the infrastructure-based positional characteristic of the vehicle 300 and a known positional characteristic of an object detected by the onboard image sensor 320 (as indicated by the digital twin). Accordingly, the offset matrix module 354 may generate the offset matrix based on various arithmetic representations of the image-based rotation matrix and the infrastructure-based rotation matrix, such as an average, minimum, or maximum of the offset roll, offset pitch, and/or offset yaw values of the image-based and infrastructure-based rotation matrices.

In one form, the rotation matrix adjustment module 358 selectively adjusts the rotation matrix of the one or more onboard image sensors 320 based on the offset matrix generated by the offset matrix module 354 and one or more additional offset matrices stored in the offset matrix database 356. The one or more additional offset matrices may be offset matrices that were previously generated by the offset matrix module 354 and are based on one or more additional infrastructure-based positional characteristics and one or more additional image-based positional characteristics of the vehicle 300. In one form, the rotation matrix adjustment module 358 selectively adjusts the rotation matrix of the one or more onboard image sensors 320 in response to the calibration condition being satisfied, as described above.

As an example, the rotation matrix adjustment module 358 selectively updates the rotation matrix by performing a recursive updating routine based on the offset matrix generated by the offset matrix module 354 and the one or more additional offset matrices stored in the offset matrix database 356. Example recursive updating routines include, but are not limited to, a recursive least-squares estimation routine, an exponential weighted moving average routine, a gradient descent routine, a root-finding routine, among others. By performing the recursive updating routine, the rotation matrix adjustment module 358 generates a recursively calibrated rotation matrix for the one or more onboard image sensors 320. Accordingly, the rotation matrix adjustment module 358 may update the current rotation matrix of the onboard image sensor 320 in response to the recursively calibrated rotation matrix not matching the current matrix. That is, the rotation matrix adjustment module 358 updates the current offset roll value, current offset pitch value, and current offset yaw value to match the recursively updated offset roll value, the recursively updated offset pitch value, and the recursively updated offset yaw value, respectively.

As a specific example, the rotation matrix adjustment module 358 performs a recursive least-squares estimation (RLSE) routine to fit a linear model to the offset matrix generated by the offset matrix module 354 and the one or more additional offset matrices stored in the offset matrix database 356 to predict the calibrated offset roll, offset pitch, and/or offset yaw values. That is, the RLSE routine generates an initial offset roll value, an initial offset pitch, and/or an initial offset yaw value based on the one or more additional offset matrices stored in the offset matrix database 356. Subsequently, the rotation matrix adjustment module 358 corrects the initial offset roll, pitch and yaw values based on the corresponding values of the offset matrix generated by the offset matrix module 354 to generate the recursively updated offset roll, pitch, and yaw values. To perform the functionality described herein, the rotation matrix adjustment module 358 may recursively calculate filter coefficients based on an algebraic Riccati equation that minimizes a weighted linear least squares cost function related to the rotation matrices. In one form, the filter coefficients may be based on a filter order parameter, a forgetting factor parameter, and an initialization parameter.

As another specific example, the rotation matrix adjustment module 358 performs an exponential weighted moving average (EWMA) routine to determine an EWMA associated with the offset matrix generated by the offset matrix module 354 and the one or more additional offset matrices stored in the offset matrix database 356. As an example, the rotation matrix adjustment module 358 defines the offset roll, offset pitch, and offset yaw values for the one or more additional matrices stored in the offset matrix database 356 (e.g., rotation matrices $R_1$-$R_4$) and the offset matrix generated by the offset matrix module 354 (e.g., rotation matrix $R_5$). Furthermore, the rotation matrix adjustment module 358 generates the recursively updated offset roll, pitch, and yaw values (vectors $Cal\_R_1$-$Cal\_R_5$) by determining, for each new rotation matrix, an exponential moving average (e.g., vectors $EWMA_1$-$EWMA_4$), as shown below in Table 1.

TABLE 1

| Example EWMA Routine | | |
| --- | --- | --- |
| Iteration | Rotation Matrices | Calibrated Rotation Matrices |
| 1 | $R_1$ | $Cal\__1 = \beta R_1$ |
| 2 | $R_2$ | $Cal\__2 = \beta R_2 + (1-\beta)\, EWMA_1$ |
| 3 | $R_3$ | $Cal\__3 = \beta R_3 + (1-\beta)\, EWMA_2$ |
| 4 | $R_4$ | $Cal\__4 = \beta R_4 + (1-\beta)\, EWMA_3$ |
| 5 | $R_5$ | $Cal\__5 = \beta R_5 + (1-\beta)\, EWMA_4$ |

In Table 1, $\beta$ is a weighting coefficient given to previous EWMAs (i.e., larger values of $\beta$ correspond to giving less weight to previous EWMAs). In some forms, the EWMAs may be a function of each preceding rotation matrix or a set of each preceding rotation matrix (e.g., the exponential moving average is calculated based on the EWMA of the ten preceding rotation matrices). While the EWMA is disclosed, it should be understood that other types of moving averages may be employed and is not limited to the example described herein, such as simple moving averages, smoothed moving averages, linear weighted moving averages, among other moving average types.

As an additional specific example, the rotation matrix adjustment module 358 performs a gradient descent routine to identify a local minimum of a differentiable function associated with the offset matrix generated by the offset matrix module 354 and the one or more additional offset matrices stored in the offset matrix database 356. That is, the local minimum of the differentiable function representing the offset roll, offset pitch, and offset yaw values may correspond to the recursively updated offset roll, pitch, and yaw values. As yet another example, the rotation matrix adjustment module 358 performs a root-finding routine to identify zero values of a continuous function associated with the offset matrix generated by the offset matrix module 354 and the one or more additional offset matrices stored in the offset matrix database 356. That is, the zero values of the continuous function representing the offset roll, offset pitch, and offset yaw values may correspond to the recursively updated offset roll, pitch, and yaw values.

Referring to FIG. 3, a flowchart illustrating an example routine 300 for calibrating the onboard image sensor 320 is shown. At 304, the vehicle control module 330 obtains the infrastructure data and the onboard image data. At 308, the vehicle control module 330 determines an infrastructure-based positional characteristic based on the infrastructure data and an image-based positional characteristic based on the image data. At 312, the calibration module 350 generates an offset matrix based on the infrastructure-based positional characteristic and the image-based positional characteristic. At 316, the calibration module 350 selectively adjust the rotation matrix of the onboard image sensor 320 based on the offset matrix and one or more additional offset matrices stored in the offset matrix database 356.

Referring to FIG. 4, a flowchart illustrating another example routine 400 for calibrating the onboard image sensor 320 is shown. At 404, the vehicle control module 330 obtains the infrastructure data and the onboard image data. At 408, the vehicle control module 330 determines an infrastructure-based positional characteristic based on the infrastructure data and an image-based positional characteristic based on the image data. At 412, the calibration module 350 determines whether the calibration condition is satisfied. If so, the routine 400 proceeds to 416. Otherwise, the routine 400 proceeds to 404. At 416, the calibration module 350 generates an offset matrix based on the infrastructure-based positional characteristic and the image-based positional characteristic. At 420, the calibration module 350 selectively adjust the rotation matrix of the onboard image sensor 320 based on the offset matrix and one or more additional offset matrices stored in the offset matrix database 356.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for calibrating an onboard image sensor of a vehicle in a manufacturing environment, the method comprising:

obtaining infrastructure data from one or more infrastructure sensors as the vehicle navigates between a first location of the manufacturing environment and a second location of the manufacturing environment;

determining an infrastructure-based positional characteristic of the vehicle based on the infrastructure data;

obtaining onboard image data from the onboard image sensor as the vehicle navigates between the first location of the manufacturing environment and the second location of the manufacturing environment;

determining an image-based positional characteristic of the vehicle based on the onboard image data and a digital twin of the manufacturing environment;

determining a calibration condition is satisfied in response to a difference between the infrastructure-based positional characteristic and the image-based positional characteristic being less than a threshold difference; and in response to the calibration condition being satisfied:

generating an offset matrix based on the infrastructure-based positional characteristic and the image-based positional characteristic; and selectively adjusting a rotation matrix of the onboard image sensor based on the offset matrix and one or more additional offset matrices.

2. The method of claim 1, wherein selectively adjusting the rotation matrix based on the offset matrix and the one or more additional offset matrices further comprises performing a recursive updating routine based on the rotation matrix based on the offset matrix and the one or more additional offset matrices.

3. The method of claim 2, wherein the recursive updating routine is a recursive least-squares estimation routine.

4. The method of claim 2, wherein the recursive updating routine is one of an exponential weighted moving average routine, a gradient descent routine, and a root-finding routine.

5. The method of claim 1, wherein the rotation matrix defines an offset roll value of the onboard image sensor, an offset pitch value of the onboard image sensor, and an offset yaw value of the onboard image sensor.

6. The method of claim 1, wherein the infrastructure-based positional characteristic of the vehicle includes an infrastructure-based location of the vehicle, an infrastructure-based pose of the vehicle, or a combination thereof.

7. The method of claim 1, wherein the image-based positional characteristic of the vehicle includes an image-based location of the vehicle, an image-based pose of the vehicle, or a combination thereof.

8. The method of claim 1, wherein the calibration condition is not satisfied in response to the image-based positional characteristic being associated with an undetectable area of the manufacturing environment that is defined by the digital twin.

9. The method of claim 1, wherein the calibration condition is not satisfied in response to one of the infrastructure-based positional characteristic and the image-based positional characteristic being associated with a predefined noise area of the manufacturing environment.

10. The method of claim 1, wherein the one or more additional offset matrices are based on one or more additional infrastructure-based positional characteristics and one or more additional image-based positional characteristics.

11. A system for calibrating an onboard image sensor of a vehicle in a manufacturing environment, the system comprising:

one or more processors and one or more nontransitory computer-readable mediums comprising instructions that are executable by the one or more processors, wherein the instructions include:

obtaining infrastructure data from one or more infrastructure sensors;

determining an infrastructure-based positional characteristic of the vehicle based on the infrastructure data;

obtaining onboard image data from the onboard image sensor;

determining an image-based positional characteristic of the vehicle based on the onboard image data and a digital twin of the manufacturing environment;

determining a calibration condition is satisfied in response to a difference between the infrastructure-based positional characteristic and the image-based positional characteristic being less than a threshold difference; and in response to the calibration condition being satisfied:

generating an offset matrix based on the infrastructure-based positional characteristic and the image-based positional characteristic; and selectively adjusting a rotation matrix of the onboard image sensor based on the offset matrix and one or more additional offset matrices.

12. The system of claim 11, wherein selectively adjusting the rotation matrix based on the offset matrix and the one or more additional offset matrices further comprises performing a recursive least-squares estimation routine based on the rotation matrix based on the offset matrix and the one or more additional offset matrices.

13. The system of claim 11, wherein the rotation matrix defines an offset roll value of the onboard image sensor, an offset pitch value of the onboard image sensor, and an offset yaw value of the onboard image sensor.

14. The system of claim 11, wherein:

the infrastructure-based positional characteristic of the vehicle includes an infrastructure-based location of the vehicle, an infrastructure-based pose of the vehicle, or a combination thereof; and the image-based positional characteristic of the vehicle includes an image-based location of the vehicle, an image-based pose of the vehicle, or a combination thereof.

15. A method for calibrating an onboard image sensor of a vehicle in a manufacturing environment, the method comprising:

obtaining infrastructure data from one or more infrastructure sensors;

determining an infrastructure-based positional characteristic of the vehicle based on the infrastructure data;

obtaining onboard image data from the onboard image sensor;

determining an image-based positional characteristic of the vehicle based on the onboard image data and a digital twin of the manufacturing environment;

determining a calibration condition is satisfied in response to a difference between the infrastructure-based positional characteristic and the image-based positional characteristic being less than a threshold difference; and in response to the calibration condition being satisfied:

generating an offset matrix based on the infrastructure-based positional characteristic and the image-based positional characteristic; and selectively adjusting a rotation matrix of the onboard image sensor based on the offset matrix and one or more additional offset matrices.

* * * * *